Sept. 27, 1949.   P. H. MEYER   2,482,787
FOOD PUSHER FOR SLICING MACHINES
Filed Nov. 6, 1944   3 Sheets-Sheet 1

Inventor
Paul H. Meyer,
By Spencer, Marzall, Johnston & Cook
Attys

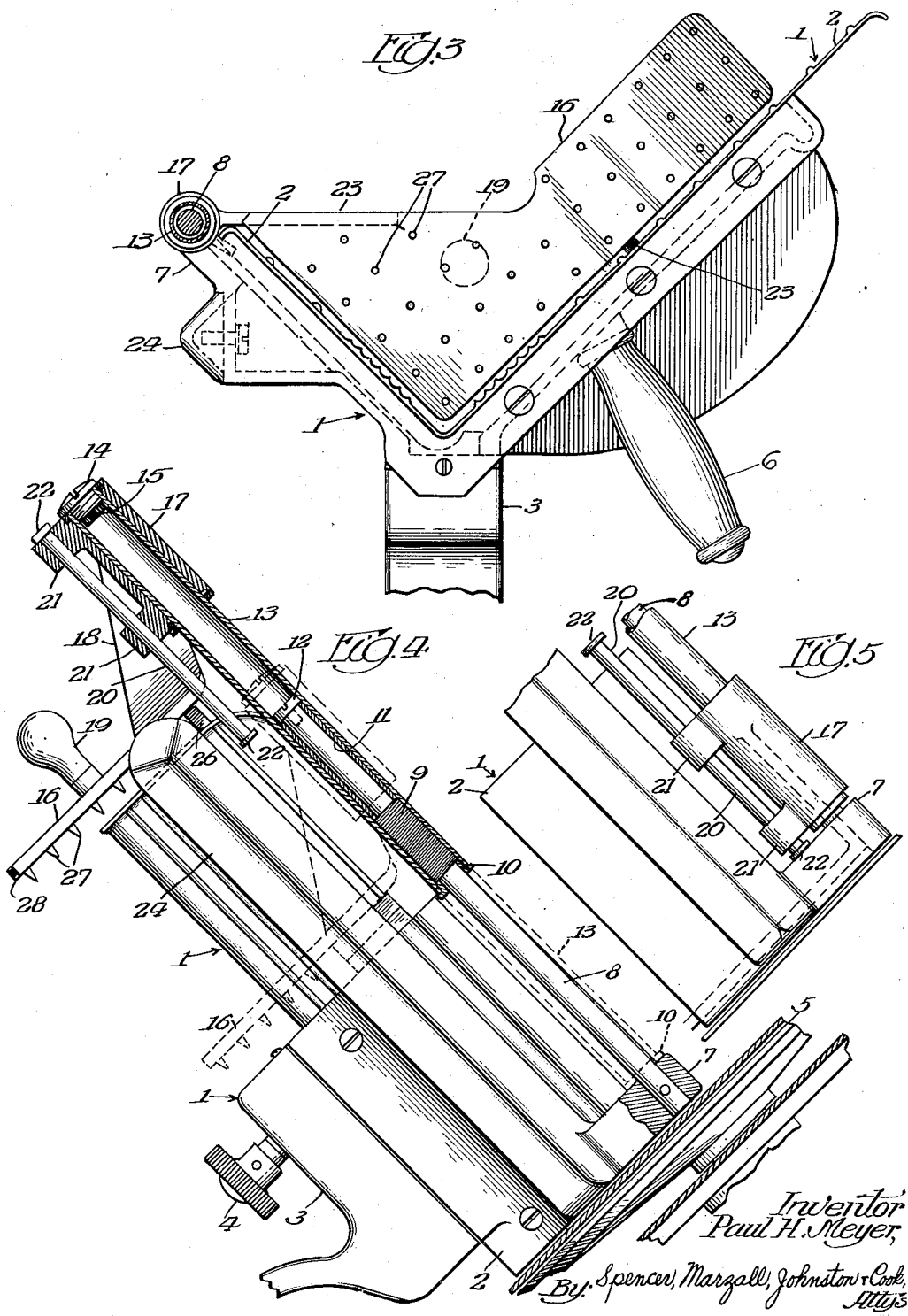

Sept. 27, 1949.   P. H. MEYER   2,482,787
FOOD PUSHER FOR SLICING MACHINES
Filed Nov. 6, 1944   3 Sheets-Sheet 3
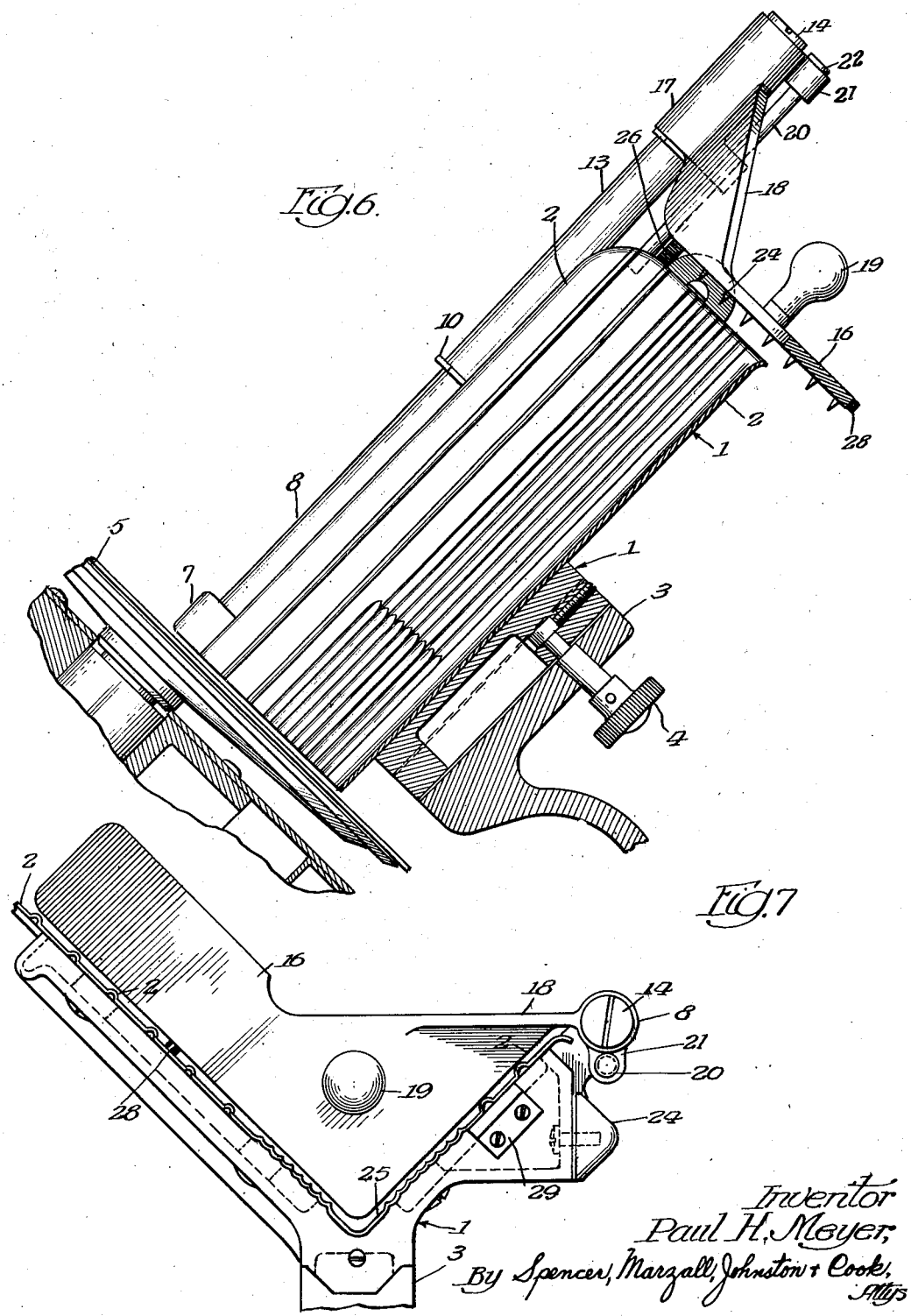

Patented Sept. 27, 1949

2,482,787

UNITED STATES PATENT OFFICE 2,482,787

FOOD PUSHER FOR SLICING MACHINES

Paul H. Meyer, La Porte, Ind., assignor to U. S. Slicing Machine Company, La Porte, Ind., a corporation of Indiana Application November 6, 1944, Serial No. 562,101

10 Claims. (Cl. 146—102)

This invention relates to slicing machines in general and particularly to a device used in conjunction with a food trough or substance support to have engagement with the substance to be sliced. More specifically, the invention relates to a food pusher or pusher plate operable normally in a trough or substance support for use in pushing substance toward a gauge plate, the food pusher or pusher plate being adapted to be shifted to an inoperative position when not in normal use.

An important object of the present invention is the provision of a food pusher for use on the meat table surface, the pusher being normally slidably mounted and being constructed and arranged so that the food pusher may not be swung out of its operating position during normal use, but which may be extended outwardly and nested below the substance support or meat table in an inoperative position when its use is not required.

Another object of the invention resides in the novel arrangement and construction of the parts to perform the functions required.

A further object of the invention resides in the provision of new and novel guides and connections whereby the entire area of the substance support or meat table may be kept free to utilize the entire full surface of the table, if desired, there being improved means to shift the food pusher from its normal operative position to a normal inoperative stow-away position beneath the substance support.

A still further object of the invention is the provision of a food pusher which is adapted to be shifted in a downwardly, forwardly arc from normal operative position to normal inoperative position, whereby the shifting of the food pusher will not foul any adjacent object, such as a showcase, which would be likely to occur if the food pusher moved in an upward and outward arc.

Numerous other objects and advantages will be apparent throughout the progress of the specification which follows.

The accompanying drawings illustrate a certain selected embodiment of the invention and the views therein are as follows:

Fig. 3 is a right-hand end view of Fig. 2, with parts omitted;

Fig. 4 is a detail elevational view partially in section, looking from rear to front, showing the food pusher in its extended or elongated position to permit the plate of the pusher to clear the outer edges of the V-trough and be positioned beneath the trough in inoperative or stow-away position;

Fig. 5 is a detail elevational view similar to Fig. 4, but showing the position of certain parts when the plate of the food pusher is at the extreme inward position adjacent the knife cutting line and the gauge plate;

Figure 2:
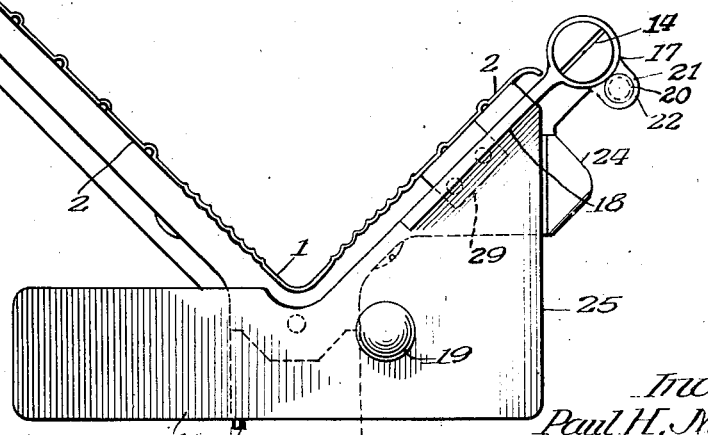
Fig. 2 is a detail end elevational view showing the food pusher in its normal inoperative or stow-away position beneath the V-shaped trough.

Fig. 6 is a detail elevational view partly in section, looking from front to rear, and showing the food pusher in its extreme extended position, as in Fig. 4, but with the pusher plate swing downwardly on its pivot to the position it occupies prior to the normal stow-away position of Fig. 2; and Fig. 7 is a detail outer end elevational view of the trough and food pusher, showing the pusher plate in full lines in its normal operating position.

The particular food pusher herein shown for the purpose of illustrating the invention is applied to the well known "U. S." meat slicing machine of the gravity type, as manufactured by the U. S. Slicing Machine Company of La Porte, Indiana, although the invention may be applied to other types and manufactures of machines. The food pusher is adapted to co-operate with the substance support, which in the present instance comprises an inclined V-shaped trough 1 having inclined substance supporting surfaces 2, 2. The surfaces 2, 2 are preferably integral and are disposed at right angles to each other, as clearly shown in Figs. 3 and 7. The trough 1 is rigidly but detachably held in position by a supporting bracket 3, there being a manually rotatably mounted member 4 for disconnectibly locking the trough to the bracket 3, Fig. 6. The trough 1, as herein shown, is inclined toward the cutting plane to permit the substance to be fed by gravity to the slicing knife 5. A handle 6 on the trough 1, Fig. 3, permits the trough 1 to be shifted to and fro in a rectilinear path past the slicing knife 5 to permit slices to be cut from the substance in the trough. The bracket 3 is slidably mounted on a longitudinal guide rod on the frame to permit the rectilinear reciprocation.

The trough or meat table 1 has a boss 7 carried or fixed thereon near the end closest to the cutting plane, and a rod or bar 8 is fastened securely and rigidly to the boss 7, such as by being pinned, threaded, or sweated thereto, and extends away from the cutting plane parallel to an edge of the surface 2 of the meat table trough 1. A coiled compression spring 9, Fig. 4, encircles the rod 8, being arranged or confined between a slidably mounted nut member 10 and a slidably mounted sleeve member 11. The head of a screw 12, which threadedly engages the outer end of the rod 8, prevents the sleeve from sliding off the rod from the urging action of the spring 9 which urges the nut member 10 and the sleeve 11 away from each other. An outer tubular member or sleeve 13, Fig. 4, surrounds the rod 8, spring 9, and sleeve 11, and has threaded engagement at its inner end with a threaded collar on the nut member 10. A threaded end member or nut 14 closes the end of the tube 13, and a resilient member 15 on the inner end of the member or nut 14, Fig. 4, acts as a bumper as well as a spacer for the nut member 10, so that the end of the nut 10 may not strike the face of the boss 7. The member 15 when tightened home will prevent such striking movement and allow for a slight clearance between the nut 10 and the face of the boss 7. This arrangement, therefore, provides for a slight adjustment of the parts as well as providing a resilient bumping surface to reduce noise and overcome clatter.

The food pusher includes a plate 16 which has its bottom formed to conform with the shape of the meat table or support 1 so that its lower edges will contact the surfaces 2, 2. An outer bearing or sleeve 17 slides on the tube 13, and this sleeve is integrally connected to the plate 16 by an offset angle bracket 18, Figs. 4 and 6. The slidable movement of the bearing or sleeve 17 on the tube 13 is limited between the members or nuts 10 and 14. A knob 19, Figs. 4 and 7, is provided on the plate 16 to shift the plate to various positions.

It is desirable for some purposes that the food pusher be maintained in its normal operating position throughout its longitudinal movement along the trough and that the pivotal movement of the pusher on the tube 13 be restricted so as to maintain normally the lower edges of the plate in proper parallel position with the surfaces 2, 2 of the meat table or trough. Therefore, means may be provided to prevent appreciable pivotal movement of the bearing 17 about the sleeve 13. This means comprises a plunger rod or bolt 20, Figs. 4 and 7, slidably mounted in ears 21, 21, formed integral with the bearing 17. The plunger 20 has enlarged ends 22 which, if desired, may be in the form of screws so as to prevent the plunger from sliding out of the supporting ears 21. The plunger rod 20 is located adjacent an outer edge of the trough and prevents the pusher from being swung out of the trough, as an attempt to swing the pusher upwardly and outwardly will bring the plunger rod against an adjacently lying edge of the trough. The pusher, therefore, is prevented from being pivotally moved out of the trough by the plunger rod 20. The plunger rod is relatively long and has slidable engagement with the ears so as to permit unobstructed movement of the food pusher in the trough. The plunger rod 20 will be slid to one extreme position when the pusher is at its extreme inward position (closest to the cutting plane), as clearly shown in Fig. 5. However, as the pusher is moved outwardly (away from the cutting plane) the ears 21 will pick up the rod and move it along with the movement of the food pusher, there being a certain amount of lost motion between the plunger rod 20 and bearing 17 due to the slidable mounting of the plunger rod 20 in the bearing ears 21.

The food pusher does have a forward (toward the operator's stance) pivotal movement on the sleeve 13, but only when the plate 16 extends beyond the outer marginal edges of the trough 1. The plate 16 is cleared from the outer edges of the trough by merely pulling the plate outwardly to the full extent of its travel. The plate 16, when pulled outwardly, will first effect a slidable movement of the bearing 17 on the tube 13; then, as the end of the bearing 17 strikes the nut 14, the sleeve or tube 13 will slide on the rod 8 and compress the spring 9, as clearly shown in Fig. 4. The full compression of the spring 9 determines the full movement permitted, the compression of the spring being confined between the inner end of the sleeve 11 and the nut member 10. The extreme outward movement of the plate, as shown in Fig. 4, clears the extreme end of the trough, whereupon the food pusher may be pivoted downwardly, as shown in Fig. 6, to bring the upper edge 23 of the plate 16 into parallelism with the under surface of an outer surface 2 of the trough, a striker plate 24 being secured to an outer surface 2 so that the pivotal movement is limited by the side 25 of the plate 16, Fig. 4, striking the plate 24, Figs. 6 and 7. Relaxation of the pulling movement of the food pusher, when the pusher is in the position shown in Fig. 6, will permit the spring 9 to draw the plate inwardly under the food table as shown in Fig. 2.

Figure 1:
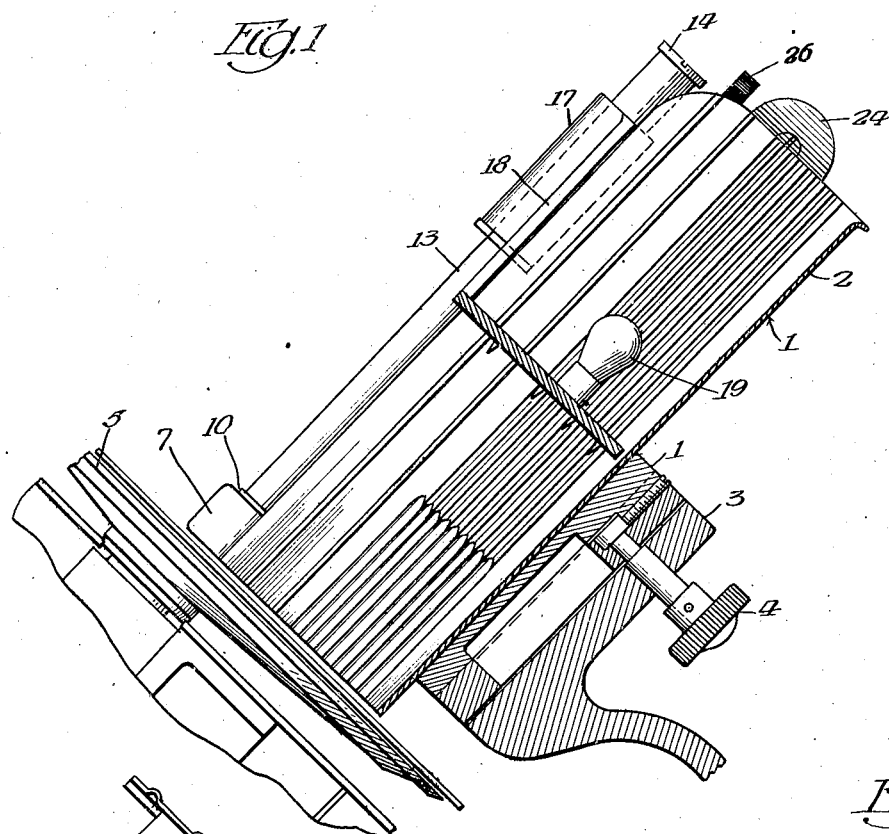
Fig. 1 is a detail sectional view of the improved food pusher showing the same in its normal operative position in a substance support of the well known V-type or shape.

The food pusher is manually manipulated to bring it from its normal inoperative or stow-away position, shown in Fig. 2, to its normal operative position, shown in Fig. 1, by pulling outwardly on the knob 19, Fig. 2, until it assumes the position shown in Fig. 6, with the tube 13 sliding on the rod 8 and the spring 9 compressed. The pusher is then swung forwardly and upwardly until the lower edges of the plate 16 are in alinement with the sides 2, 2 of the trough, as shown in Fig. 4, the spring still being compressed. Relaxation or release of the knob 19 permits the spring 9 to expand, whereupon the nut 10 will be in the position shown in Fig. 1, and in dotted lines shown in Fig. 4. The food pusher is thus in its normal operative position, lying in the food trough with the bearing having free slidable movement on the tube 13, the spring being extended, and the tube 13 being collapsed, and the parts no longer being telescoped outwardly, Fig. 1.

A guide member or striker button 26 is formed on the extreme outer surface 2 of the trough 1 to prevent the substance engaging teeth 27 on the plate 16 from striking the outer edges of the trough during the movement of the food pusher from the Fig. 1 position to the Fig. 2 position, or vice versa. The member 26 is so positioned that it will not foul the teeth 27, the member 26 being positioned either to operate between teeth or on a smooth part of the plate. A button 28 of fibre, rawhide, or other suitable material may be fastened to a bottom edge of the plate 16 for contacting sliding engagement with a surface 2 to hold the pusher in proper angular position and to prevent marring of the food table during the slidable movement of the food pusher along the table. A bumper 29, Figs. 2 and 7, may be fastened to a surface of the meat table 1, beneath a surface 2, to provide a rest or stop for the plate 16 when it is in its normal inoperative stow-away position, Fig. 2.

The present food pusher is adapted particularly for use on a gravity meat slicer of the type shown in applicant's co-pending applications Serial No. 576,633, filed February 7, 1945, and Serial No. 747,994, filed May 14, 1947, and assigned to the present assignee.

The invention provides a telescopingly mounted pusher plate construction which cannot be pivoted during normal operation but which is capable of having limited pivotal movement when the parts are extended, so that the pusher may be nested or stowed away beneath the meat table.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A food pusher for co-operation with a meat table of a slicing machine and comprising a telescoping rod secured to the meat table, a pusher plate slidably and rotatably mounted on the rod for movement along the meat table intermediate its marginal ends when the rod is telescoped, means permitting slidable movement of the plate along the rod when the rod is telescoped, means including a plunger carried by the pusher plate and slidable with respect thereto, means with which the plunger co-operates for preventing pivotal movement of the plate about the rod between said marginal edges when the rod is telescoped, and also when said rod is extended, said rod being adapted to be extended to permit the plate to be moved beyond the outer marginal edges of the meat table, and means permitting pivotal arcuate movement of the plate about the rod in a predetermined direction when the rod is extended whereby the plate may be positioned beneath the meat table.

2. A food pusher for co-operation with an inclined V-shaped substance supporting table of a slicing machine and comprising a telescoping rod secured to the meat table, spring means normally maintaining the rod in telescoped position, a pusher plate slidably and rotatably mounted on the rod for movement along the meat table intermediate the marginal ends of the table when the rod is in telescoped position, means permitting slidable movement of the plate along the rod when the rod is telescoped, said pusher plate having surfaces conforming with the shape of the V-shaped trough and adapted normally to maintain a nested position with respect to the surfaces of the trough, means preventing arcuate pivotal movement of the plate about the rod between said marginal edges when the rod is telescoped, said rod being adapted to be extended to permit the plate to be moved beyond an outer marginal edge of the table, means to permit pivotal arcuate movement of the plate about the rod when the rod is extended whereby the plate may be positioned beneath the table, said plate having an inclined surface conforming to an inclined surface of the table to permit the plate to be nested beneath the table, said means for preventing pivotal movement of the plate about the rod while the plate is arranged between the marginal edges of the table embodying an element operatively secured to a part of the plate, movable therewith and with respect thereto and co-operating with means carried by a part on the table, and means for effecting movement of the said element with respect to the plate.

3. A pusher plate co-operating with an article supporting table of a slicing machine, an extensible guide upon which said plate is movable, means tending normally to maintain the pusher plate for operation intermediate the marginal edges of said table, and the said guide against extension, means for maintaining said pusher plate against arcuate movement away from the table while the plate is operating upon the table, and also when the plate is moved to a substantial distance beyond a marginal edge of the table, against the stress of the first recited means, the second recited means, when the pusher is beyond the edge of the table, operating to permit the pusher to be moved into a position below the table and to prevent arcuate movement thereof in another direction, the first said means then acting to move the pusher plate under the said table, the means for maintaining said pusher plate against arcuate movement away from the table, embodying a member mounted upon a part of the pusher plate for movement therewith and with respect thereto in directions lengthwise of the said guide, and a stop engageable by said member.

4. A pusher plate co-operating with an article supporting table of a slicing machine, an extensible guide upon which said plate is movable, means tending normally to maintain the pusher plate for operation intermediate the marginal edges of said table, and the said guide against extension, and means for maintaining said pusher plate against arcuate movement away from the table while the plate is operating upon the table, and also when the plate is moved to a substantial distance beyond a marginal edge of the table, against the stress of the first recited means, the second recited means, when the pusher is beyond the edge of the table, operating to permit the pusher to be moved into a position below the table, the first said means then acting to move the pusher plate under the said table, the means for maintaining the said pusher plate against arcuate movement away from the table, embodying a plunger rod slidably mounted upon a portion of the pusher plate, and engaging a stop on the table intermediate the ends of the plunger rod.

5. A pusher plate co-operating with an article supporting table of a slicing machine, an extensible guide upon which said plate is movable, means tending normally to maintain the pusher plate for operation intermediate the marginal edges of said table, and the said guide against extension, means for maintaining said pusher plate against arcuate movement away from the table while the plate is operating upon the table, and also when the plate is moved to a substantial distance beyond a marginal edge of the table, against the stress of the first recited means, the second recited means, when the pusher is beyond the edge of the table, operating to permit the pusher to be moved into a position below the table, the first said means then acting to move the pusher plate under the said table, the means for maintaining the pusher plate against arcuate movement away from the table, embodying a plunger rod slidable in bearings connected with the pusher plate and engaging a stop intermediate the ends of the plunger rod, and means for limiting the sliding movement of the plunger rod in its bearings.

6. A pusher plate co-operating with an article supporting table of a slicing machine, an extensible guide for the plate, including a fixed guide member, a movable guide member slidable thereupon and to which latter the pusher plate is connected, a stop member carried by the movable guide member and freely slidable with respect thereto, a stop with which the stop member co-operates to maintain the pusher plate against arcuate movement away from the table when within the marginal edges of the latter, and to also maintain it against movement in one direction when the pusher plate is beyond said edge, and means operating in response to the sliding movement of the pusher plate upon the guide member, for shifting the said stop member with respect to the pusher plate, while maintaining said stop member at all times in an active position with relation to said stop.

7. A pusher plate co-operating with an article supporting table of a slicing machine, an extensible guide for the plate, including a fixed guide member, a movable guide member slidable thereupon and to which latter the pusher plate is connected, a stop member carried by the movable guide member and freely slidable with respect thereto, a stop with which the stop member co-operates to maintain the pusher plate against arcuate movement away from the table when within the marginal edges of the latter, and to also maintain it against movement in one direction when the pusher plate is beyond said edge, means operating in response to the sliding movement of the pusher plate upon the guide member, for shifting the said stop member with respect to the pusher plate, while maintaining said stop member at all times in an active position with relation to said stop, the said stop member being slidable in a bearing and extending a substantial distance on each side of the bearing, and a shoulder on one end of the stop member, adapted to be engaged by the bearing to shift the stop member in one direction, the other end of the stop member engaging a stationary abutment to shift the stop member in the other direction.

8. A food pusher for cooperation with an inclined V-shaped substance supporting table of a slicing machine having a knife and comprising a telescoping rod secured to the meat table, spring means normally maintaining the rod in telescoped position, a pusher plate slidably and rotatably mounted on the rod for movement along the meat table intermediate the marginal ends of the table when the rod is in telescoped position, means permitting slidable movement of the plate along the rod when the rod is telescoped, said pusher plate having surfaces conforming with the shape of the V-shaped trough and adapted normally to maintain a nested position with respect to the surfaces of the trough, means preventing arcuate pivotal movement of the plate about the rod between said marginal edges when the rod is telescoped, said rod being adapted to be extended to permit the plate to be moved beyond an outer marginal edge of the table, means to permit pivotal arcuate movement of the plate about the rod when the rod is extended whereby the plate may be positioned beneath the table, said plate having an inclined surface conforming to an inclined surface of the table to permit the plate to be nested beneath the table, said means for preventing pivotal movement of the plate about the rod while the plate is arranged between the marginal edges of the table comprising means slidably mounted to a part of the plate cooperating with means secured to a part on the table, means normally urging said slidable means in a direction toward the knife, whereby said slidable means will remain in abutting relation with the table edge to prevent arcuate movement of the pusher in one direction when the pusher is moved beyond the end of the table in the same relative position which it assumed while feeding, teeth on a face of said plate, and a part carried by a marginal edge of the table to prevent the teeth from fouling the table and to protect said teeth when the plate is being swung from a position above the table to a position beneath the table.

9. A pusher plate cooperating with an article supporting table of a slicing machine having a knife, an extensible guide upon which said plate is movable, yieldable means tending normally to maintain the pusher plate for operation intermediate the marginal edges of said table, and the said guide against extension, slidable means for maintaining said pusher plate against arcuate movement away from the table while the plate is operating upon the table, and also when the plate is moved to a substantial distance beyond a marginal edge of the table, against the stress of the first recited means, and means normally urging said slidable means in a direction toward the knife, whereby said slidable means will remain in abutting relation to the table edge to prevent arcuate movement of the pusher in one direction when the pusher is moved beyond the end of the table in the same relative position it assumed while feeding, but permitting the pusher to be moved into a position below the table, the first said means then acting to move the pusher plate under the said table.

10. A food pusher for cooperating with a V-shaped substance supporting table of a slicing machine and comprising a telescoping rod secured to the table, a pusher plate movable along said table, a bearing sleeve member rigidly connected with the pusher plate and slidably and rotatably mounted on the telescoping rod, means tending normally to maintain the pusher plate for operation intermediate the ends of the table, and the said telescoping rod against extension, stop means for maintaining the pusher plate against arcuate movement away from the table while the pusher plate is operating upon the table, and also when the pusher plate is moved beyond one end of the table against the stress of the first recited means, said stop means including an ear depending from the bearing sleeve member and supporting a stop rod extending toward the slicing end of the table and beyond the substance engaging surface of the pusher plate, said ear being rotatable into stopped relation to the underside of the table while the pusher plate is operating upon the table and the stop rod being rotatable into stopped relation to the underside of the table when the pusher plate is beyond the end of the table, the pusher plate being rotatable to a position below the table when beyond the end of the table and the first recited means then acting to move the pusher plate under said table.

PAUL H. MEYER.

REFERENCES CITED

The following references are of record in the file of this patent:

UNITED STATES PATENTS

| Number | Name | Date |
|---|---|---|
| 1,359,362 | Gulla | Nov. 16, 1920 |
| 1,698,868 | Wolff | Jan. 15, 1929 |
| 1,865,411 | Campbell | June 28, 1932 |
| 1,889,542 | Campbell | Nov. 29, 1932 |
| 2,058,519 | Sivertsen | Oct. 27, 1936 |
| 2,087,898 | Campbell | July 27, 1937 |
| 2,286,772 | Van Berkel | June 16, 1942 |